(12) United States Patent
Reinig

(10) Patent No.: US 9,174,663 B2
(45) Date of Patent: Nov. 3, 2015

(54) SNOW RIDER

(71) Applicant: Karl Reinig, Denver, CO (US)

(72) Inventor: Karl Reinig, Denver, CO (US)

( * ) Notice: Subject to any disclaimer, the term of this patent is extended or adjusted under 35 U.S.C. 154(b) by 91 days.

(21) Appl. No.: 13/843,534

(22) Filed: Mar. 15, 2013

(65) Prior Publication Data

US 2014/0265178 A1    Sep. 18, 2014

(51) Int. Cl.
*B62B 13/12*    (2006.01)

(52) U.S. Cl.
CPC .................................. *B62B 13/12* (2013.01)

(58) Field of Classification Search
CPC .............. A63C 5/03; A63C 5/02; A63C 5/16; A63C 5/00
USPC ................... 280/14.1, 19.1, 20, 22.1
See application file for complete search history.

(56) References Cited

U.S. PATENT DOCUMENTS

| | | | |
|---|---|---|---|
| 1,600,735 A | 9/1926 | Pederson | |
| 3,862,764 A | 1/1975 | Hartz | |
| 4,116,455 A | 9/1978 | Dotson et al. | |
| 4,194,753 A | 3/1980 | Schrishuhn, Jr. | |
| 4,221,394 A | 9/1980 | Campbell | |
| 4,243,238 A * | 1/1981 | Johnson | 280/20 |
| 4,334,691 A | 6/1982 | Scheib | |
| 4,449,735 A | 5/1984 | McDougall | |
| 4,453,742 A | 6/1984 | Zepkowski | |
| 4,669,723 A | 6/1987 | Arsenian | |
| 4,796,902 A | 1/1989 | Capra | |
| 4,886,298 A | 12/1989 | Shols | |
| 5,000,466 A | 3/1991 | Den Hartog | |
| 5,161,810 A | 11/1992 | DeCesare | |
| 5,458,370 A * | 10/1995 | Melcher | 280/817 |
| 5,496,239 A | 3/1996 | Kallman et al. | |
| 5,558,354 A * | 9/1996 | Lion | 280/607 |
| 5,865,446 A * | 2/1999 | Kobylenski et al. | 280/14.23 |
| 6,113,115 A * | 9/2000 | Hurth | 280/15 |
| 6,341,786 B1 * | 1/2002 | Kermis | 280/14.22 |
| 6,416,064 B1 | 7/2002 | Evans | |
| 6,648,348 B2 * | 11/2003 | Link | 280/14.25 |
| 6,682,083 B2 * | 1/2004 | Melcher | 280/14.26 |
| 7,484,738 B2 | 2/2009 | Belt | |
| 2002/0185828 A1 | 12/2002 | Melcher | |
| 2002/0195788 A1 | 12/2002 | Tierney et al. | |
| 2009/0102146 A1 | 4/2009 | Belt | |
| 2013/0277956 A1 * | 10/2013 | Walburn et al. | 280/818 |

FOREIGN PATENT DOCUMENTS

WO    WO-03095295 A1    11/2003

* cited by examiner

*Primary Examiner* — Brodie Follman
*Assistant Examiner* — Brian Cassidy
(74) *Attorney, Agent, or Firm* — Graziano IP Law LLC

(57) ABSTRACT

The Snow Rider provides a rider with a platform that is stable, simple to use, and provides a significant amount of control for the rider. The Snow Rider makes use of two pairs of parallel-oriented articulated skis that are interconnected by a platform on which the rider's bindings are attached. The front and back end of the platform are connected to respective front and rear articulated segments of the pair of skis via control linkages which include trucks that translate leaning by the rider into a redirection of the Snow Rider and by simultaneously operable outriggers which get the skis up on edge and in contact with the snow as they are turned. The rider can either face the direction of motion as with skis or perpendicular to the direction of motion as with a snowboard.

14 Claims, 5 Drawing Sheets

SNOW RIDER

FIELD OF THE INVENTION

This invention relates to a Snow Rider that makes use of a pair of parallel-oriented articulated skis that are interconnected by a platform on which the rider's bindings are attached. The front and back end of the platform are connected to respective front and rear articulated segments of the pair of skis via control linkages which include trucks that translate leaning by the rider into a redirection of the Snow Rider and by simultaneously operable outriggers which get the skis up on edge and in contact with the snow as they are turned.

BACKGROUND OF THE INVENTION

There are several types of sporting equipment that enable a user to glide over snow, make turns, and control their speed. The primary products in this category are skis and snowboards, both of which are equipped with bindings that receive and secure boots that are worn by the user.

The skis orient the user facing in the direction of travel, with one foot on each ski, so the skis are oriented in a substantially parallel relationship when the user is in motion. A ski is typically a narrow strip of wood, plastic, metal, or a combination thereof, worn underfoot to enable the wearer to glide over snow. Substantially longer than wide and characteristically employed in pairs, skis are attached to boots with bindings, either with a free, lockable, or permanently secured heel. Examining the ski from front to back along the direction of travel, the front of the ski (typically pointed or rounded) is the "tip," the middle is the "waist," and the rear (typically flat) is the "tail." All skis have four basic measures that define their basic performance: length, width, sidecut, and camber. Skis also differ in more minor ways to address certain niche roles. For instance, mogul skis are much softer to absorb shocks, and powder skis are much wider to provide more float.

In contrast, snowboards are a single board that is usually as wide as the length of the wearer's foot. Snowboards are further differentiated from skis by the stance of the user. In skiing, the user stands with feet in-line with the direction of travel (parallel to long axis of board), whereas in snowboarding, users stand with their feet transverse to the length dimension of the snowboard. Snowboards generally require bindings and special boots that help secure both feet of a snowboarder, who generally rides in an upright position. The bindings are separate components from the snowboard deck and are very important parts of the total snowboard interface. The bindings' main function is to hold the rider's boot in place tightly to transfer their energy to the board. Most bindings are attached to the board with three or four screws that are placed in the center of the binding. There are two types of stance-direction used by snowboarders. A "regular" stance places the rider's left foot at the front of the snowboard, while the opposite stance direction places the rider's right foot at the front, as in skateboarding. Regular is the most common.

Neither snowboards nor skis turn much by having the rider simply lean. To initiate a turn on either of these devices, the rider must push the back ends of the ski or snowboard around. With a snowboard, the learning process generally takes multiple outings involving significant collisions with the ground before the rider can take on even modest green slopes. Skiers generally rely on the snowplow position where the skis are pointed in a "V" shape in front of the skier to slow their forward motion and to initiate turns early on. Again, days are required before even modest hills can be conquered by a novice skier and, after years, only the best riders can truly ski the moguls. Most simply scrape off the top of the moguls as they slide sideways in an attempt to remain in control of their motion. Thus, neither of these technologies is user friendly and both require a significant investment in time and professionally administered lessons for the user to develop a modest level of competence.

In an analogous field, water skis enable a rider who is towed by a boat to execute turns as they travel over the surface of the water. While the tow rope limits the range of motion of the rider, the basic nature of the skis is similar to those used in snow skiing.

BRIEF SUMMARY OF THE INVENTION

The Snow Rider provides a rider with a platform that is stable, simple to use, and provides a significant amount of control for the rider. The Snow Rider makes use of a pair of articulated skis that are interconnected by a platform on which the rider's bindings are attached. The front and back end of the platform are connected to respective front and rear articulated segments of the pair of skis via control linkages which include trucks that translate leaning by the rider into a redirection of the Snow Rider and by simultaneously operable outriggers which get the skis up on edge and in contact with the snow as they are turned. The rider can either face the direction of motion as with skis or perpendicular to the direction of motion as with a snowboard. A seat could also replace the bindings, thereby allowing the rider to sit instead of standing.

The articulated nature of each set of skis is critical to providing control of the rider's motion, since by linking the front articulated segment to the rear articulated segment in each of the pair of parallel-oriented skis, these articulated segments form an arc as the rider executes a turn and the pair of skis remains in a parallel orientation. It is important to note that if you just put skis on trucks, when you lean, the skis will turn; however, they will remain flat on the snow. The result is that the rider slides sideways down the hill but does not "carve" a turn. The Snow Rider mechanism uses outriggers to get the skis up on edge as they are turned so the skis gain traction from the snow to execute the turn in a smooth and controlled manner. The simultaneous turning of the skis and getting them up on edge are initiated and controlled by the amount the rider leans to either side. In one implementation, the trucks are mounted in opposite directions on each end of the platform on which the rider is standing. Thus, when the rider leans to the right, the front skis turn to point to the right, while the back skis turn to point to the left. With this symmetry, the rider can go either forward or backward with the same control, much the same way they can go forward or backward on a skateboard. This sort of symmetry allows for doing 180-degree turns with a high degree of control.

In addition, the relative motion between the articulated segments includes rotation along the long axis to allow the rider to tilt the front and rear articulated segments with some independence and rotation perpendicular to the long axis to allow for the front and rear articulated segments to absorb troughs and peaks between the two articulated segments. This relative motion includes rotation about the long axis of the platform to allow the rider to vary the relative degree to which the front and back articulated segments of the skis are turned and rotated, providing a simplified method of producing a sideways slide.

DETAILED DESCRIPTION OF THE INVENTION

Basic Architecture

The following description of a preferred embodiment illustrates the functional elements that are used to implement a surface rider, which enables a rider to travel down an inclined slope, such as over snow on a ski slope, propelled by gravity, or over a substantially flat surface, such as over water, towed by a boat. The details disclosed herein are not intended to limit the scope of the invention, which is defined in the appended claims, but simply to provide a teaching of the functional elements to one of ordinary skill in the art. In order to accomplish this goal, the following description is directed to a Snow Rider, which is used to enable the rider to travel down an inclined snow covered slope, with the disclosed apparatus being bi-directional in nature, akin to a snowboard, so any designation of "front" or "back" are arbitrary in nature, as is the location and direction of the bindings shown. The rider can be positioned in a number of places and orientations, and the specifics of such are left up to the preferences of the rider.

Figure 1:
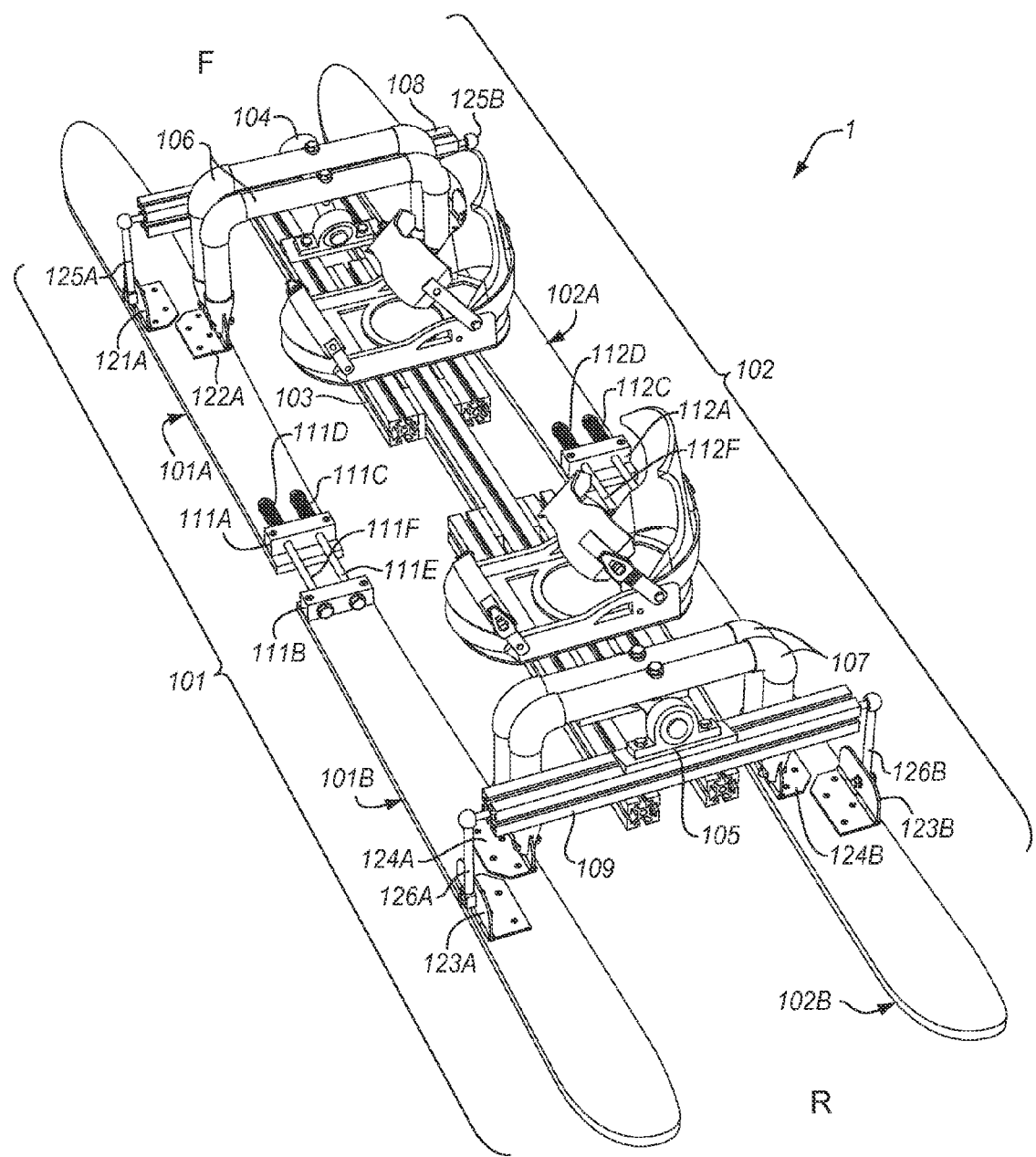
FIG. 1 illustrates a perspective view of the Snow Rider.

FIG. 1 illustrates a perspective view of the Snow Rider 1 that typically consists of a pair 101, 102 of parallel-oriented articulated segments 101A-101B, 102A-102B that are interconnected by a platform 103 on which the rider's bindings 110A, 110B are attached. Since the location and type of bindings can vary widely, a simple illustration of bindings is included to simply show their presence and typical location. The "front" end F and "rear" end R of the platform 103 are connected to respective front and rear articulated segments 101A, 102A and 101B, 102B of the pair of articulated skis 101, 102 via control linkages which include simultaneously operable trucks 104, 108 and 105, 109, respectively, which translate leaning by the rider into a redirection of the Snow Rider 1 and outriggers 106, 107 which get the skis 101, 102 up on edge and in contact with the snow as they are turned.

Details of the Snow Rider

Figure 2:
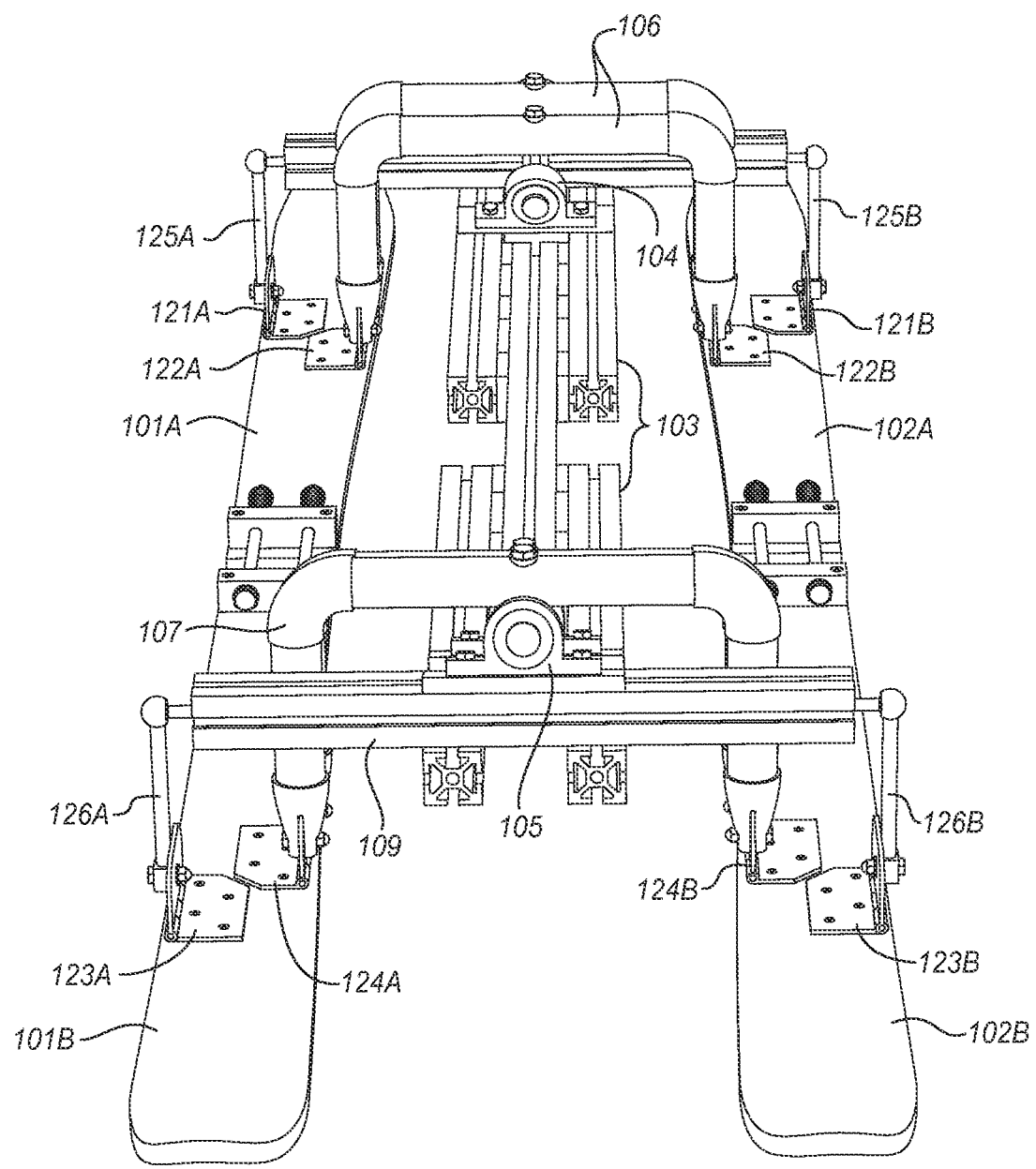
FIG. 2 illustrates an end perspective view of the Snow Rider.
Figure 5:
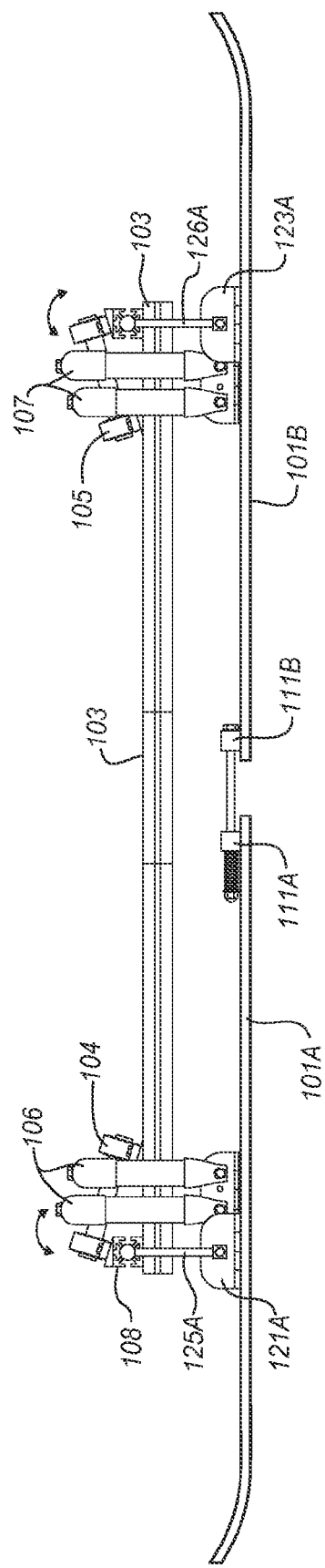
FIG. 5 illustrates a side view of the Snow Rider.
Figure 6:
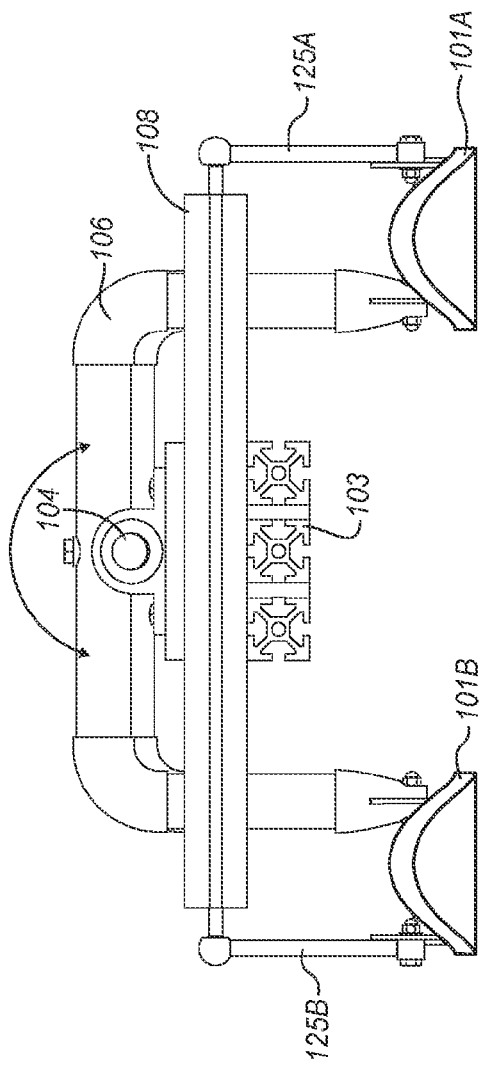
FIG. 6 illustrates an end view of the Snow Rider.
Figure 7:
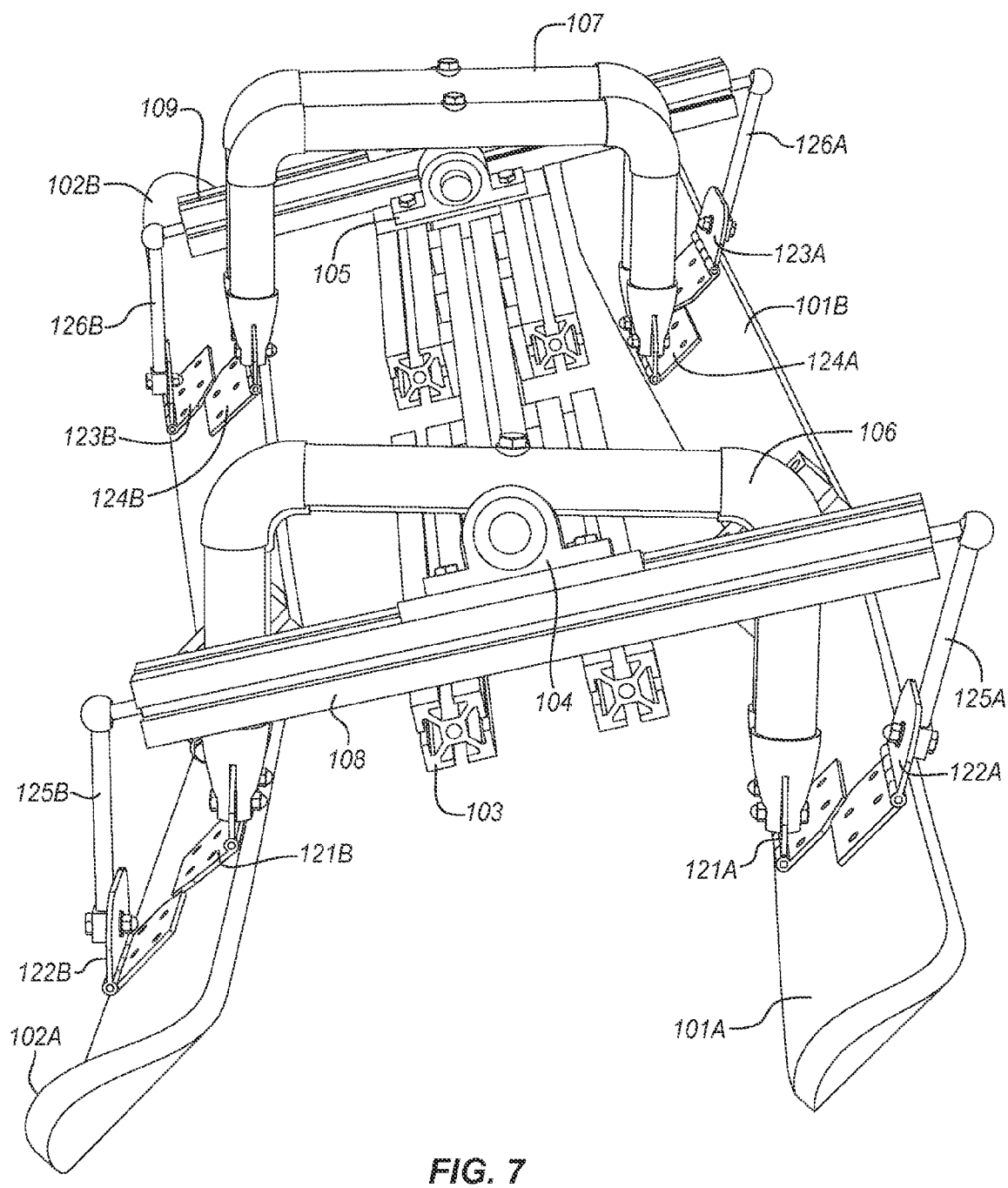
FIG. 7 illustrates a simplified view of the truck on the front end of the Snow Rider as a turn is being executed.

FIG. 1 illustrates a perspective view of the Snow Rider 1, FIG. 2 illustrates an end perspective view of the Snow Rider, FIG. 5 illustrates a side view of the Snow Rider, FIG. 6 illustrates an end view of the Snow Rider, and FIG. 7 illustrates a simplified view of the truck on the front end of the Snow Rider as a turn is being executed. As noted above, a pair of articulated skis 101, 102 are interconnected by a platform 103 on which the rider's bindings 110 are attached. The front and back end of the platform 103 are connected to respective front 101A, 102A and rear 101B, 102B articulated segments of the articulated skis 101, 102 via control linkages which include trucks 104, 108 and 105, 109 respectively, similar to what are used on skateboards, to translate the leaning by the rider into a redirection of the Snow Rider 1 and outriggers 106, 107 which get the skis 101, 102 up on edge and in contact with the snow as they are turned (as described below). The rider can either face the direction of motion as with skis or perpendicular to the direction of motion as with a snowboard.

For the purpose of simplicity, the following description uses the example of having the rider perpendicular to the direction of motion as with a snowboard.

Each of the pair of skis 101, 102 consist of two articulate segments 101A, 101B and 102A, 102B that are joined by articulating linkages 111A-111F, 112A-112F, respectively. The articulating linkages consist of mounting blocks 111A, 111B and 112A, 112B that are fastened to the inwardly facing ends of ski elements 101A, 101B and 102A, 102B, respectively. The blocks 111A, 111B and 112A, 112B are themselves interconnected by a spring-loaded mechanism, shown as bolts 111E, 111F with their associated springs 111C, 111D and likewise shown as bolts 112E, 112F with their associated springs 112C, 112D. In order to provide the proper flexion between the first and second articulated segments, one set of blocks 111A, 111B or 112A, 112B is pivotally connected to their associated articulate segments 101A, 101B and 102A, 102B.

Control Linkages

Outrigger and Truck Mechanisms

The Truck Mechanisms are, for the purpose of simplicity, referred to as 104, 108 and 105, 109, but these references include all of the linkages, connecting apparatus, and mounting brackets as described herein. Truck Mechanisms 104, 108 and 105, 109 are mounted on either end of platform 103. This mounting is accomplished via pillow blocks 104, 105, each of which consist of a first pillow block connected to platform 103, and a mating (second) pillow block connected to Outriggers 106, 107 via a rod.

Outriggers 106, 107 serve to interconnect skis 101, 102 and, while illustrated as a pair of elements at each end of the skis 101, 102, they may be implemented by a single element. Outriggers 106, 107 are connected to articulated segments 101A, 101B, 102A, 102B via hinged brackets 122A, 124A, 122B, 124B (as shown in more detail in FIG. 7). It is Outriggers 106, 107 hinged attachments to the skis 101, 102 that cause the skis 101, 102 to get on edge in response to the shifting weight of the rider, while it is Truck Mechanisms 104, 108, 105, 109, that cause the direction of the skis 101, 102 to change. As shown in FIG. 7, the platform 103 hangs in a cradle-like configuration, supported by Outriggers 106, 107. The attachment of Outriggers 106, 107 to the skis 101, 102 is shown as medial (toward the edge that is nearest the center line of the articulated segments 101A, 101B, 102A, 102B), although various other placements relative to the center line of the articulated segments 101A, 101B, 102A, 102B are intended to be within the scope of this description.

Truck Mechanisms 104, 108 and 105, 109 are connected to articulated segments 101A, 101B, 102A, 102B of the skis 101, 102 via hinged brackets 121A, 121B and 123A, 123B. Cross Bars 108, 109 of the Truck Mechanisms 104, 105, 108, 109 are connected via rods 125A, 125B and 126A, 126B that are pivotally connected to the associated hinged brackets 121A, 121B and 123A, 123B. The connection of the rods 125A, 125B and 126A, 126B to Cross Bars 108, 109 is implemented using a ball and socket connection to enable the range of motion required to execute a turn, as illustrated in FIG. 7.

Executing a Turn

Figure 3:
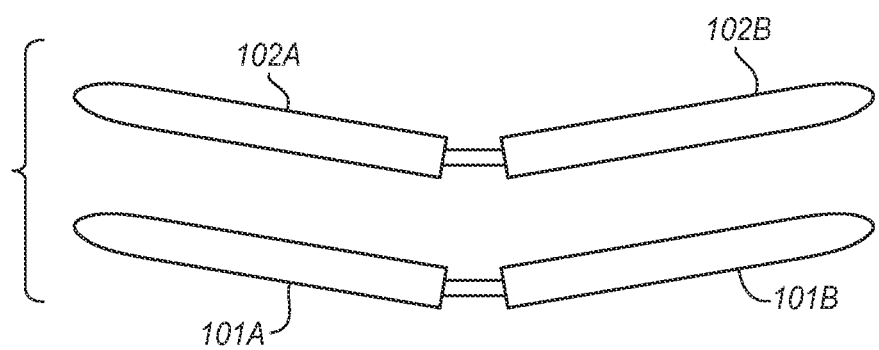
FIGS. 3 and 4 illustrate top and end views of the skis of the Snow Rider when a rider is executing a turn.
Figure 4:
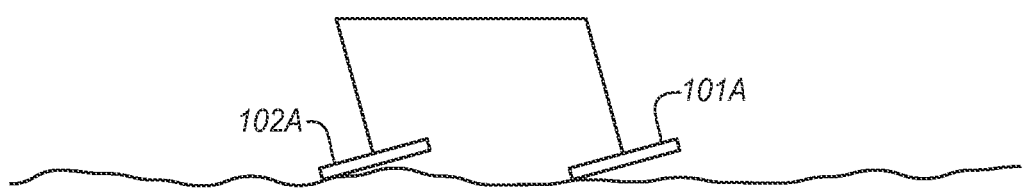

In order to understand the operation of the Snow Rider 1, FIGS. 3 and 4 illustrate top and end views of the skis of the Snow Rider when a rider is executing a turn, and FIG. 7 illustrates a simplified view of the front truck as a rider is executing a turn. As shown above, FIGS. 1, 2, 5, and 6 demonstrate the mode where there has been no leaning and all four articulated segments 101A, 101B, 102A, 102B are parallel. When the articulated segments 101A, 101B, 102A, 102B are made to curve up at both ends, the Snow Rider 1 will go either way (F or R) with no difference in performance.

As shown in FIG. 3, by interconnecting the interior facing ends of articulated segments 101A, 101B and 102A, 102B, when the front end F of the Snow Rider 1 turns, the front articulated segment 101A pivots on Truck Mechanism 104, 108, with the interior facing end of articulated segment 101A rotating in the opposite direction of the front of articulated segment 101A. The rotation of the interior facing end of articulated segment 101A causes the rotation of the interior facing end of articulated segment 101B in the same direction since the two ends are coupled by articulating linkage 111A-111F, 112A-112F, as shown in FIG. 3. Thus, the rotation of the front articulated segment 101A and the rear articulated segment 101B cause the two to form a piecewise linear arc, with the front articulated segment 102A and the rear articulated segment 102B also rotating in analogous manner. FIG. 3 demonstrates the skis 101, 102 turning in opposite directions to create a turn. While it is difficult to see here, the skis are all up on edge, with the edges being uphill to the turn, as shown in FIG. 4.

The turn of Snow Rider 1 is facilitated by Truck Mechanisms 104, 108 and 105, 109, the operation of which is shown in FIGS. 5 and 6. In particular, Truck Mechanisms 104, 108 and 105, 109 rotate in the direction illustrated by the arrow in FIG. 5; and Outriggers 106, 107 rotate as shown by the arrow in FIG. 6. The combination of these rotations in conjunction with the articulating linkages controlling the spacing and orientation of the articulated segments 101A, 101B, 102A, 102B cause the articulated segments 101A, 101B, 102A, 102B to get on edge to cause the Snow Rider 1 to turn.

FIG. 7 is a close up of the rods 125A and 125B connecting the upper part of the Truck Mechanism, which is stationary with respect to the rider, with the articulated segments 101A, 102A. As the rider leans, the rods 125A and 125B either push or pull the articulated segments 101A, 102A appropriately to create a classic carving turn. When the Snow Rider 1 is going straight, the two Cross Bars 108, 109 are parallel to each other, the skis 101, 102 are flat on the snow, and they point in line with the rider's platform 103. When the rider leans, Cross Bars 108, 109 develop angles both perpendicular to the long axis of the system and perpendicular to the vertical direction. The skis 101, 102 get on edge and they turn. The result is a carving turn that is more aggressive the stronger the rider leans. The Snow Rider 1 tends toward self-righting, the same way a skateboard does.

Note that the rider can opt not to lean, keeping the skis flat, and initiate a slide. If they do that such that they are sliding perpendicular to the direction of travel, when they lean against the direction of travel, the skis go into their carve and point resembling the classic snowplow. This gives a method for the rider to stop quickly without turning.

SUMMARY

The Snow Rider provides a rider with a platform that is stable, simple to use, and provides a significant amount of control for the rider. The Snow Rider makes use of two pairs of parallel-oriented articulated skis that are interconnected by a platform on which the rider's bindings are attached. The front and back ends of the platform are connected to respective front and rear skis of the pair of articulated skis via trucks that translate leaning by the rider into a redirection of the Snow Rider by getting the skis up on edge and in contact with the snow as they are turned.

What is claimed:

1. A surface rider system for enabling a rider to ride over a surface and execute turns thereon, comprising:
    a platform, having a center line segment extending along its length from a first end to a second end, for supporting rider;
    a pair of skis, wherein each of the skis comprise first and second articulated segments, each on opposite sides of and oriented substantially parallel to the center line segment of the platform; and
    first and second control linkages for attaching a first of the two articulated segments of each of the pair of skis to the platform at a location proximate to the first end of the platform and a second of the two articulated segments of each of the pair of skis to the platform at a location proximate to the second end of the platform, respectively, and responsive to the rider shifting their weight to either side of the center line segment of the platform as the surface rider moves either down an inclined surface or towed across a substantially flat surface, for simultaneously and synchronously redirecting a center line segment of each of the articulated segments to provide a variable turning radius and twisting of the articulated segments about their center line segments to engage the surface with an edge of the articulated segments, comprising:
    first and second spring loaded linkages, connected to juxtaposed ends of the first and second segments of the first and second skis, respectively, for providing a flexible connection that allows for relative motion between the two skis that includes rotation about the center line segment of the platform to allow the rider to vary the relative degree to which the front and back skis are turned and rotated by the rider shifting their weight on the platform and to provide a return force to bring the skis back to being in line when not overcome be the force of the riders shifting their weight.

2. The surface rider of claim 1 wherein the first and second spring loaded linkages are, respectively, fixedly connected to one of the juxtaposed ends of the first and second articulated segments, and pivotally connected to the other of the juxtaposed ends of the first and second articulated segments.

3. The surface rider of claim 1 wherein the first and second spring loaded linkages are responsive to redirection of the first articulated segment of the ski, to redirect the second articulated segment in a direction that is opposite to the direction of the first segment thereby to form a piecewise linear arc.

4. The surface rider of claim 1 in which the connection between the first articulated segment and the second articulated segment allows for relative motion between the two.

5. The surface rider of claim 4 wherein the relative motion includes rotation along the long axis to allow the rider to tilt the front and rear segments with some independence and rotation perpendicular to the center line segment to allow for the front and rear articulated segments to absorb troughs and peaks between the two articulated segments.

6. The surface rider of claim 4 wherein the relative motion includes rotation about the center line segment of the platform to allow the rider to vary the relative degree to which the front and back articulated segments are turned and rotated, to provide a simplified method of producing a sideways slide.

7. The surface rider of claim 1 wherein the skis consist of a plurality of articulated segments connected to the platform.

8. The surface rider of claim 1 wherein the first and second control linkages each comprise:
    first and second trucks responsive to the rider shifting their weight to either side of the center line segment of the platform for simultaneously and synchronously redirecting a center line segment of each of the articulated segments to provide a variable turning radius of the articulated segments.

9. The surface rider of claim 8 wherein:
the first truck comprises:
a first cross bar connected to the first of the articulated segments of the first ski and the platform to enable rotation of the articulated segments about a center line segment of the first truck, which is roughly perpendicular to the center line segment of the platform; and
the second truck comprises:
a second cross bar connected to the second of the articulated segments of the first ski and the platform to enable rotation of the articulated segments about a center line segment of the second truck, which is roughly perpendicular to the center line segment of the platform.

10. The surface rider of claim 1 wherein the first and second trucks further comprise:
a hinged bracket connected to respective ones of the articulated segments of the first and second skis to enable rotation of the articulated segments about the center line segment of the articulated segments.

11. The surface rider of claim 1 wherein the first and second control linkages each comprise:
an outrigger for twisting of the articulated segments about their center line segments to engage the surface with an edge of the articulated segments.

12. The surface rider of claim 11 wherein the first and second trucks further comprise:
a rod rotatably connected to the outrigger and pivotally connected to the hinged bracket for simultaneously and synchronously redirecting a center line segment of each of the articulated segments to provide a variable turning radius.

13. The surface rider of claim 11 wherein the first and second control linkages each further comprise:
a hinged bracket for connecting the outrigger to a corresponding articulated segment.

14. The surface rider of claim 1 further comprising:
at least one binding, attached to the platform, for securing the platform to the feet of the rider.

* * * * *